May 10, 1960
S. EPSTEIN
2,936,184
ROUND VENT PIPE COUPLING CONSTRUCTION
Filed April 20, 1956
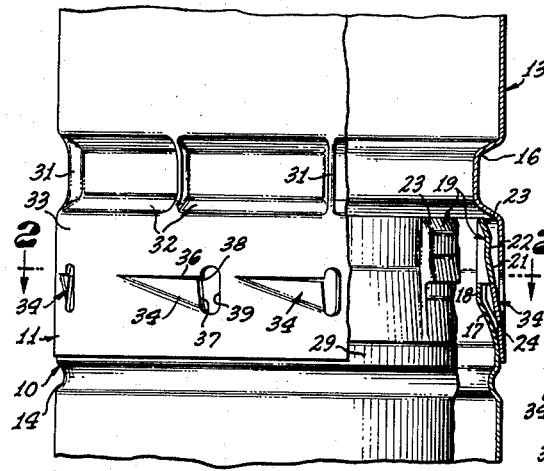
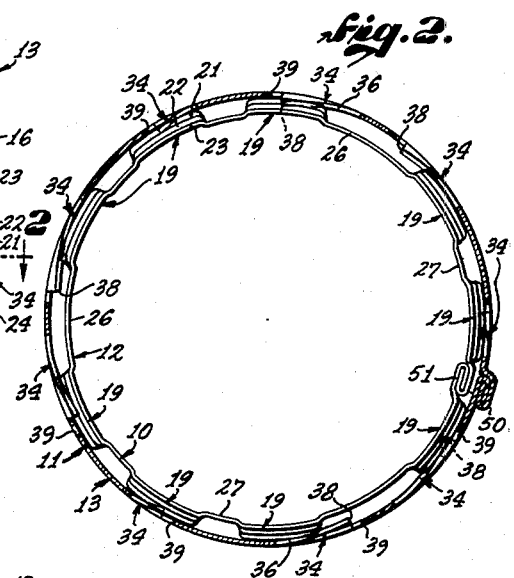
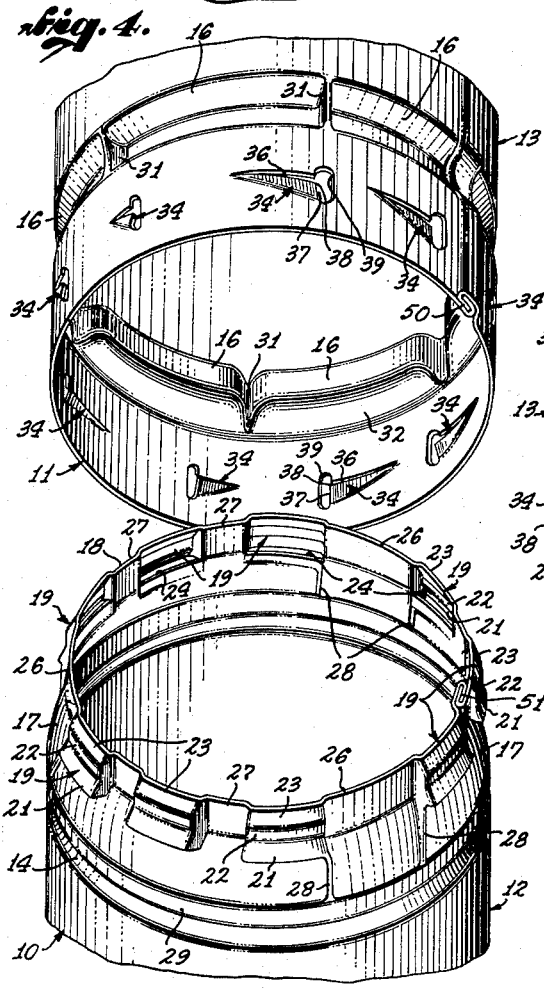
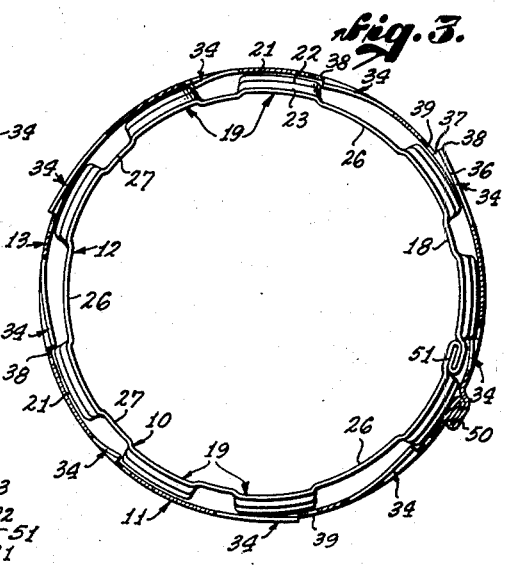
SAUL EPSTEIN,
INVENTOR.
HUEBNER, BEEHLER,
WORREL & HERZIG,
ATTORNEYS.
BY
Albert M. Herzig

United States Patent Office 2,936,184
Patented May 10, 1960

2,936,184

ROUND VENT PIPE COUPLING CONSTRUCTION

Saul Epstein, Los Angeles, Calif.

Application April 20, 1956, Serial No. 579,585

3 Claims. (Cl. 285—81)

This invention relates to an improved vent pipe coupling construction, and particularly to improve male and female coupler constructions at the ends of a section of vent pipe.

The sections of a vent pipe should be designed and constructed for rapid and convenient installation without special installation methods or equipment. This, in effect, means that the male and female couplers of the vent pipe sections should be designed and constructed for rapid and convenient assembly and disassembly. In addition, the vent pipe sections should be light in weight, but rugged in construction, to keep manufacturing and maintenance costs at a minimum.

At the same time, the couplers should be designed and constructed for secure, rapid and convenient assembly as well as rapid and convenient disassembly without the use of complicated methods or tools. In addition, the male and female couplers should be designed for construction by the use of low cost mass production methods and equipment. Furthermore, the couplers of each vent pipe section should make safe, tight seals without the use of caulking compounds or sealing cements.

Accordingly, it is an important object of my invention to provide a rugged and durable vent pipe construction designed for rapid and efficient manufacture by the use of low cost mass production methods and machinery and by the employment of a minimum amount of hand labor.

Another object is to provide an improved vent pipe section construction having male and female couplers that can be rapidly, conveniently and efficiently assembled and disassembled from adjacent couplers, without the necessity of using special installation and disassembly methods or tools.

A further object is to provide a vent pipe construction having light weight and low construction cost, but having male and female couplers capable of making safe, tight joints without the use of caulking compounds or sealing cements and without the employment of excessive amounts of hand labor.

Additional objects will become apparent from the following description:

In general terms, my invention comprehends a vent pipe construction having a male coupler means on one end and a female coupler means on the other end. Boss means are provided on the male coupler end and tooth means are provided on the female coupler end. The tooth means are designed to engage the boss means of a male coupler end when the latter is inserted into the female coupler end to form a pipe joint.

The boss means preferably are formed annularly in spaced relationship in the wall of the pipe section on the male end, and preferably are formed to extend equally inward from the male coupler end. Also, the boss means preferably are slotted transversely at their inward ends to provide openings to receive the tooth means.

The tooth means preferably are cut annularly in spaced relationship on the female coupler end and preferably are formed to have a horizontal edge and a vertical edge meeting in a point adapted for positioning inward of the pipe wall for engaging in the slots of the boss means. Stop means preferably are formed in the pipe section inward from the male coupler end, to engage the tooth means in a formed pipe joint, when one of the sections of the joint is rotated in a given direction. The stop means is designed to limit such rotation and lock the joint.

A more detailed description of a specific embodiment of my invention is given with reference to the drawing, wherein:

Figure 1 is a side elevational view with portions broken away showing a joint between two vent pipe sections made by a male and female coupler;

Figure 2 is a cross-sectional view taken along the line 2—2 of Figure 1 showing details of the joint and the construction of the couplers;

Figure 3 is a view similar to that of Figure 2 showing the relationship of the couplers in the joint prior to rotation of one of the pipe sections to lock the joint; and Figure 4 is a partial perspective view showing the male and female couplers in disassembled relationship.

In the specific embodiment of my invention shown in the drawing, a male coupler 10 and a female coupler 11 are formed on opposite ends of a vent pipe section 12. The female coupler 11 is shown in the drawing positioned on one end of a vent pipe section 13 for coupling with another vent pipe section 12 showing a male coupler 10. This arrangement of each coupler on a different pipe section, instead of both couplers on the same section is used for convenience in describing my invention.

Although the drawing shows the application of my invention to vent pipe sections having a single wall, it will be understood that the invention is applicable to double wall vent pipe sections. In such double wall vent pipe sections, an inner wall section may be positioned concentrically in spaced relationship with the outer wall sections, such as sections 12 and 13, for example.

Male coupler 10 is formed on the end of pipe section 12 in the wall of the section. An annular groove 14 is formed by indentation in the wall of the section adjacent the end thereof to impart resilience to the male coupler 10 and to strengthen the end of the pipe section against inward deformation.

Instead of the ring 14, a series of annularly end to end indentations can be formed to also serve as spacer means to space an inner pipe wall (not shown) when the invention is applied to double wall sections. Such an annular end to end indentation arrangement is shown at 16 on Figure 1, on vent pipe section 13.

The male coupler end of vent pipe section 12 is tapered inwardly, as shown at 17, for convenience in inserting the male coupler end into the female coupler end. Outwardly of tapered section 17 is formed a cylindrical section 18, adjacent the edge of the male coupler end to impart rigidity and strength thereto.

Bosses 19 are formed around the male coupler end 10 in annularly spaced relationship. The bosses are made to extend longitudinally through the cylindrical portion 18, and partially into the inwardly tapered portion 17 in the wall of the vent pipe section 12. Thus the bosses 19 have an inwardly tapered portion 21 and a cylindrical portion 22. The innermost portion of the cylindrical portion 22 of the bosses 19 also is tapered inwardly at 23. The purpose of this tapered portion is to provide a suitable bearing surface against the inside edge of the indentations shown at 16 in the vent pipe section 13 when section 13 is coupled to the vent pipe section 12 through female coupler 11.

The bosses 19 are preferably made to extend equal distances inward on the end of vent pipe section 12 from the edge of male coupler 10. At the innermost end thereof the bosses 19 are provided with transverse slots 24 formed or cut through the wall of the vent pipe section 12. The slots 24 are adapted to engage teeth formed on the female coupler 11, as will be described below.

Different arrangements of the spacing and grouping of the bosses 19 can be used. In the specific embodiment shown in the drawing, three bosses 19 are grouped together in spaced relationship with respect to each other. Each group of three bosses 19 is spaced from adjacent groups of three bosses, as shown at 26, a distance greater than the distance 27 between adjacent bosses of each group of three.

A longitudinal stop projection 28 is formed in the wall of the vent pipe section 12, through inwardly tapered portion 17, and is made to extend beyond the inner end of each of the end bosses 19 of each group of three bosses. The stop projection 28 is formed at the outer end of each outer boss in each group of three bosses.

Intermediate annular groove 14, and the inner end of stop projection 28, is formed an annular bead, or cylindrical portion 29, to serve as a seat for the edge of female coupler 11 when a joint is made between the male and female coupler. The portion 29 is designed to tightly engage the edge of female coupler 11 so that the joint is tightly made between the two pipe sections 12 and 13.

A female coupler 11 is formed on the opposite end of vent pipe section 12 (not shown), but for convenience and description is shown on an equivalent end of a vent pipe section 13. Adjacent the end of the vent pipe section 13 is formed a series of annularly end to end indentations 16, with reinforcing ribs 31 at the ends of the indentations. The indentations 16 are formed in the wall of the vent pipe section 13 at such a position that the inner annular edges 32 thereof are positioned to tightly engage the inwardly tapered portions 23 of bosses 19 for rigidifying and stiffening the joint. Outwardly of indentations 16 is a cylindrical portion 33 extending to the edge of the female coupler 11.

In cylindrical portion 33 of the female coupler 11 are teeth 34, formed and arranged in annularly spaced relationship in groups of three. Each group of three teeth is spaced from adjacent groups of three to correspond with the spacing of the bosses 19 in the male coupler 10, described above. In each group of three teeth 34, an end tooth, designed to engage a stop projection 28, may be made somewhat shorter and stiffer for such stop engagement purposes.

The teeth 34 are made to have horizontal edges 36 and vertical edges 37 meeting in points 38. These edges of the teeth are made by cutting through the wall of the vent pipe section 13 in cylindrical portion 33 in a horizontal direction and in a vertical direction. The resulting teeth 34 are flexible and can be directed inwardly or outwardly of the vent pipe section 13.

To facilitate outward direction of the teeth 34, elongate apertures 39 are formed through the wall of the vent pipe section 13 at the vertical edge of each tooth. The apertures 39 are designed to receive the blade of a screw-driver for convenient outward prying of the teeth 34.

In making the joint of the male coupler 10 with female coupler 11, in the embodiment shown in the drawing, the male coupler 10 is positioned below as shown in Figure 4 and the female coupler 11 is positioned above, also as shown. Reading in a counterclockwise direction on female coupler 11, when the first tooth 34 is the shortest and stiffest for stop means purposes, the first and second teeth 34 of each group of three are positioned or bent inwardly so that the points 38 of the teeth are directed inward of the surface of section 33. The third tooth of each group of three is positioned or bent outwardly so that the point 38 of the tooth is directed outwardly of the cylindrical portion 33, as shown in Figure 3.

The annular edge of female coupler 11 then is brought downward over the end of male coupler 10 so that the latter is inserted in the former. When the cylindrical portion 33 of female coupler 11 is brought around the bosses 19, the vent pipe section 13 is turned in one direction or the other until the teeth 34 are brought in registry with the bosses 19.

Force is then applied axially of vent pipe section 13 until the female coupler 11 snaps over the male coupler 10. This occurs as the first and second inwardly directed teeth 34, of each group of three teeth, snaps over the innermost edge of each of two bosses 19 to engage in transverse slots 24 thereof. This results in the preliminary formation of the joint between vent pipe sections 12 and 13 at the male and female coupler ends.

If, for some reason, it is desired to disassemble the joints so made, the male or female coupler is rotated by turning pipe section 12 or 13, until the first and second teeth 34, of each group of three, become disengaged from the transverse slots 24 in two of the bosses 19. The vent pipe sections 12 and 13 are then simply disassembled at the couplers by pulling them axially in opposite directions.

When it is desired to permanently make the joint, the male coupler 10 and female coupler 11 are again positioned as shown in Figure 4, and the male coupler 12 is inserted in female coupler 11, as described above, with the teeth 34 in registry with the bosses 19. The inwardly directed teeth 34 are again snapped over the bosses 19 until the teeth engage in the transverse slots 24, as described above. To lock the joint in position the third tooth 34, of each group of three teeth then is pushed inwardly.

This can be accomplished by the use of a screw-driver, or similar tool to inwardly direct the point 38 on the third tooth 34 in the manner in which the first and second teeth are directed inwardly. The female coupler 11 then is rotated in a clockwise direction until the first tooth 34 engages against an elongate stop projection 28 to lock the joint. The joint is then permanently made and will not come apart.

Alternatively, the female coupler 11 is positioned relative to the male coupler 10 so that seams 50 and 51, respectively, are substantially in alignment with each other. Force then is applied to the two couplers, as described above, to snap-lock them together by pressing the end of the female coupler over that of the male coupler. The resulting pipe joint is strongest when the seams 50 and 51 are in line. All nine teeth 34 of the female coupler 11 are tightly locked in place under the shoulders of the bosses 19 formed by slots 24 on the male coupler 10.

If, however, for some reason it again is desired to disassemble the joint, the third tooth 34, of each group of three teeth, is bent outwardly so that the point 38 of the third tooth is directed outwardly of the cylindrical surface 33 of the female coupler 11. This can be conveniently accomplished by inserting the blade of a screw-driver into aperture 39 adjacent the vertical edge of each third tooth 34, and prying the tooth outwardly. The joint then is disassembled by turning the female coupler 11 in a counterclockwise direction until a force applied axially of vent pipe section 13 causes a disassembly of the female coupler 11 from the male coupler 10.

In an alternative method of separating a completed joint, one of the couplers of the joint is twisted relative to the other so that the shorter end tooth, 34 of each group of three teeth on the female coupler 11, is in line with the seam 51 on the male coupler 10. Every third tooth, or opposite end tooth of each group of three, is then pried outwardly, as described above. This will unlock these teeth from the male coupler bosses 19. The joint then can be separated.

To remake the joint, the three teeth 34, which were pried outwardly to separate the couplers, are bent inwardly again into their previous positions. The male and female couplers then are pressed together again, as described above, to remake the joint.

It will be seen that a very tight, but easily assembled and disassembled joint, is established between adjacent sections 12 and 13 of the vent pipe. The resulting joint is tight and safe against the escape of vent gases without the use of caulking compounds or sealing cements. The light-weight and rugged construction of the vent pipe sections of my invention result in low unit and installation costs. Expensive support blocks are not required to support the vent pipe sections of my invention in assembled form as distinguished from the necessity of using such expensive support blocks with the heavier prior art flues. Furthermore, it will be observed that the assembly and disassembly operations are carried out without the use of elaborate tools or special assembly or disassembly methods.

While I have herein shown and described my invention in what I have conceived to be the most practical and preferred embodiment, it is recognized that departures can be made therefrom within the scope of my invention, which is not to be limited to the details disclosed herein, but is to be accorded the full scope of the claims so as to embrace any and all equivalent structure.

Having described my invention, what I claim as new and desire to secure by Letters Patent is:

1. A vent pipe coupling comprising: a female member having a cylindrical portion; a male member having a cylindrical portion adapted to reside within said cylindrical portion of said female member; circumferentially equally spaced groups of tooth means on said cylindrical portion of said female member, each group of tooth means having a plurality of circumferentially spaced inwardly directed teeth each having a horizontal edge and a vertical edge, and one tooth of each group having a horizontal edge substantially shorter than the other teeth; similarly spaced groups of circumferentially spaced boss means on the outer periphery of said cylindrical portion of said male member, each group having a plurality of circumferentially spaced outwardly directed bosses, each tooth of each group other than one longer tooth being circumferentially positioned so as to be capable of simultaneously passing between a pair of adjacent bosses and said one longer tooth of each group being readily deformable to pass over a boss for subsequent abutment behind said last-mentioned boss.

2. A vent pipe in accordance with claim 1 including stop projection means in circumferentially spaced relationship to the male coupler means and adapted to engage said vertical edge of said tooth means when one of the members is rotated in one direction, whereby each of said tooth means is positioned to engage an adjacent boss to lock the joint.

3. A vent pipe in accordance with claim 1 wherein said tooth means is flexible, whereby each tooth is manually disengageable from a boss for selectively separating said joint.

References Cited in the file of this patent
UNITED STATES PATENTS

| | | |
|---|---|---|
| 202,368 | Newton | Apr. 16, 1878 |
| 442,837 | Ward | Dec. 16, 1890 |
| 981,866 | Lockhart | Jan. 17, 1911 |
| 1,053,743 | Paiste | Feb. 18, 1913 |
| 1,324,897 | Holub | Dec. 16, 1919 |
| 1,447,949 | Hall | Mar. 6, 1923 |
| 1,851,404 | Rose | Mar. 29, 1932 |
| 2,537,284 | Schuder | Jan. 19, 1951 |
| 2,626,731 | Ekins | Jan. 27, 1953 |